US012652674B2

(12) United States Patent
Zhu et al.

(10) Patent No.: US 12,652,674 B2
(45) Date of Patent: Jun. 9, 2026

(54) CONFIGURING UPLINK TRANSMISSION CONFIGURATION INDICATION STATES

(71) Applicant: LENOVO (BEIJING) LIMITED, Beijing (CN)

(72) Inventors: Chenxi Zhu, Fairfax, VA (US); Wei Ling, Beijing (CN); Bingchao Liu, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 630 days.

(21) Appl. No.: 18/017,492

(22) PCT Filed: Jul. 23, 2020

(86) PCT No.: PCT/CN2020/103736
§ 371 (c)(1),
(2) Date: Jan. 23, 2023

(87) PCT Pub. No.: WO2022/016441
PCT Pub. Date: Jan. 27, 2022

(65) Prior Publication Data
US 2023/0276454 A1      Aug. 31, 2023

(51) Int. Cl.
*H04W 72/231*      (2023.01)
*H04B 7/0456*      (2017.01)
*H04L 5/00*      (2006.01)

(52) U.S. Cl.
CPC ........ *H04W 72/231* (2023.01); *H04B 7/0456* (2013.01); *H04L 5/0048* (2013.01);
(Continued)

(58) Field of Classification Search
None
See application file for complete search history.

(56) References Cited

U.S. PATENT DOCUMENTS 11,737,081 B2      8/2023   Moon et al.
2019/0082456 A1      3/2019   Kim et al.
(Continued)

FOREIGN PATENT DOCUMENTS

CN      111278128 A      6/2020
CN      116235565 A   *  6/2023   ........... H04L 5/0094
(Continued)

OTHER PUBLICATIONS

OPPO, "Discussion on Multi-beam Operation Enhancements", 3GPP TSG RAN WG1 #98 R1-1908352, Aug. 26-30, 2019, pp. 1-9.
(Continued)

*Primary Examiner* — Andrew C Oh
(74) *Attorney, Agent, or Firm* — Kunzler Needham & Hilton

(57) ABSTRACT

Apparatuses, methods, and systems are disclosed for configuring UL-TCI states. One method includes receiving a RRC message configuring a set of UL-TCI states. Each UL-TCI state defines at least one uplink spatial relationship. Each uplink spatial relationship corresponds to a spatial domain transmission filter corresponding to a CSI-RS, a SSB, or an SSB. The method includes receiving a MAC CE message comprising information that activates a subset of the set of UL-TCI states for use in an UL-TCI field of DCI used to schedule a codebook-based PUSCH transmission. The method includes receiving the DCI with the UL-TCI field indicating the at least one uplink spatial relationship for the UE to use for the codebook-based PUSCH transmission. The method includes transmitting the codebook-based PUSCH transmission with the at least one uplink spatial relationship indicated by the UL-TCI field in the DCI.

20 Claims, 6 Drawing Sheets

(52) U.S. Cl.
CPC .......... *H04L 5/0053* (2013.01); *H04L 5/0094*
(2013.01); *H04L 5/0098* (2013.01)

(56) References Cited

U.S. PATENT DOCUMENTS

| | | | | |
|---|---|---|---|---|
| 2021/0028843 | A1* | 1/2021 | Zhou | H04B 7/063 |
| 2022/0029764 | A1* | 1/2022 | Liou | H04L 5/0094 |
| 2022/0132534 | A1* | 4/2022 | Jang | H04L 1/08 |
| 2022/0209904 | A1* | 6/2022 | Jang | H04L 27/26025 |
| 2022/0210810 | A1* | 6/2022 | Khoshnevisan | H04W 72/1268 |
| 2022/0255700 | A1* | 8/2022 | Jang | H04L 5/0044 |
| 2022/0312337 | A1* | 9/2022 | Lim | H04W 52/242 |
| 2022/0322245 | A1* | 10/2022 | Park | H04W 52/365 |
| 2022/0338212 | A1* | 10/2022 | Cao | H04L 5/0094 |
| 2023/0048881 | A1* | 2/2023 | Zhu | H04L 5/0048 |
| 2023/0105758 | A1* | 4/2023 | Zheng | H04L 5/0094 |
| | | | | 370/329 |
| 2023/0198719 | A1* | 6/2023 | Wang | H04L 5/0048 |
| | | | | 370/329 |
| 2023/0209567 | A1* | 6/2023 | Grossmann | H04L 5/0051 |
| | | | | 370/329 |
| 2023/0239806 | A1* | 7/2023 | Määttänen | H04W 52/54 |
| | | | | 370/329 |
| 2023/0269725 | A1* | 8/2023 | Chen | H04W 72/0446 |
| | | | | 370/329 |
| 2023/0276454 | A1* | 8/2023 | Zhu | H04L 5/0051 |
| | | | | 370/329 |
| 2023/0284149 | A1* | 9/2023 | Zhu | H04W 16/28 |
| | | | | 370/318 |
| 2023/0300826 | A1* | 9/2023 | Zhou | H04L 5/0051 |
| | | | | 370/329 |
| 2023/0379835 | A1* | 11/2023 | Matsumura | H04W 52/54 |
| 2023/0379902 | A1* | 11/2023 | Matsumura | H04B 7/0695 |
| 2023/0389040 | A1* | 11/2023 | Yokomakura | H04W 72/1273 |
| 2024/0014971 | A1* | 1/2024 | Zheng | H04L 5/0048 |
| 2024/0049193 | A1* | 2/2024 | Abdelghaffar | H04W 76/20 |
| 2024/0073727 | A1* | 2/2024 | Zhou | H04W 24/10 |
| 2024/0098740 | A1* | 3/2024 | Muruganathan | H04L 5/0053 |
| 2024/0214947 | A1* | 6/2024 | Park | H04L 5/0053 |
| 2024/0214954 | A1* | 6/2024 | Lim | H04W 52/42 |
| 2025/0211391 | A1* | 6/2025 | Liu | H04L 5/0044 |

FOREIGN PATENT DOCUMENTS

| | | | | | |
|---|---|---|---|---|---|
| CN | 117581502 | A | * | 2/2024 | |
| CN | 119968787 | A | * | 5/2025 | H04B 7/06 |
| EP | 3826403 | A1 | | 7/2019 | |
| KR | 20190028336 | A | | 3/2019 | |
| KR | 1020190054978 | A | | 5/2019 | |
| KR | 20190129721 | A | | 11/2019 | |
| KR | 20200020272 | A | | 2/2020 | |
| KR | 20230038712 | A | * | 3/2023 | H04L 5/005 |
| WO | 2019130858 | A1 | | 7/2019 | |
| WO | 2019215709 | A1 | | 11/2019 | |
| WO | WO-2021159515 | A1 | * | 8/2021 | H04W 72/044 |
| WO | WO-2022228458 | A1 | * | 2/2022 | H04L 5/0087 |
| WO | WO-2024095417 | A1 | * | 5/2024 | H04B 7/08 |

OTHER PUBLICATIONS

LG Electronics, "Discussion on multi-beam based operations and enhancements", 3GPP TSG RAN WG1 Meeting #98 R1-1908700, Aug. 26-30, 2019, pp. 1-13.

International Searching Authority, "Written Opinion of the International Searching Authority," PCT/CN2020/103736, Apr. 19, 2021, pp. 1-4.

ZTE, Maintenance of enhancements on multi-beam operation, 3GPP TSG RAN WG1 Meeting #100bis-e, R1-2001597, Apr. 20-30, 2020, pp. 1-13, e-Meeting.

* cited by examiner

200

300

400

402

404

408

410

406

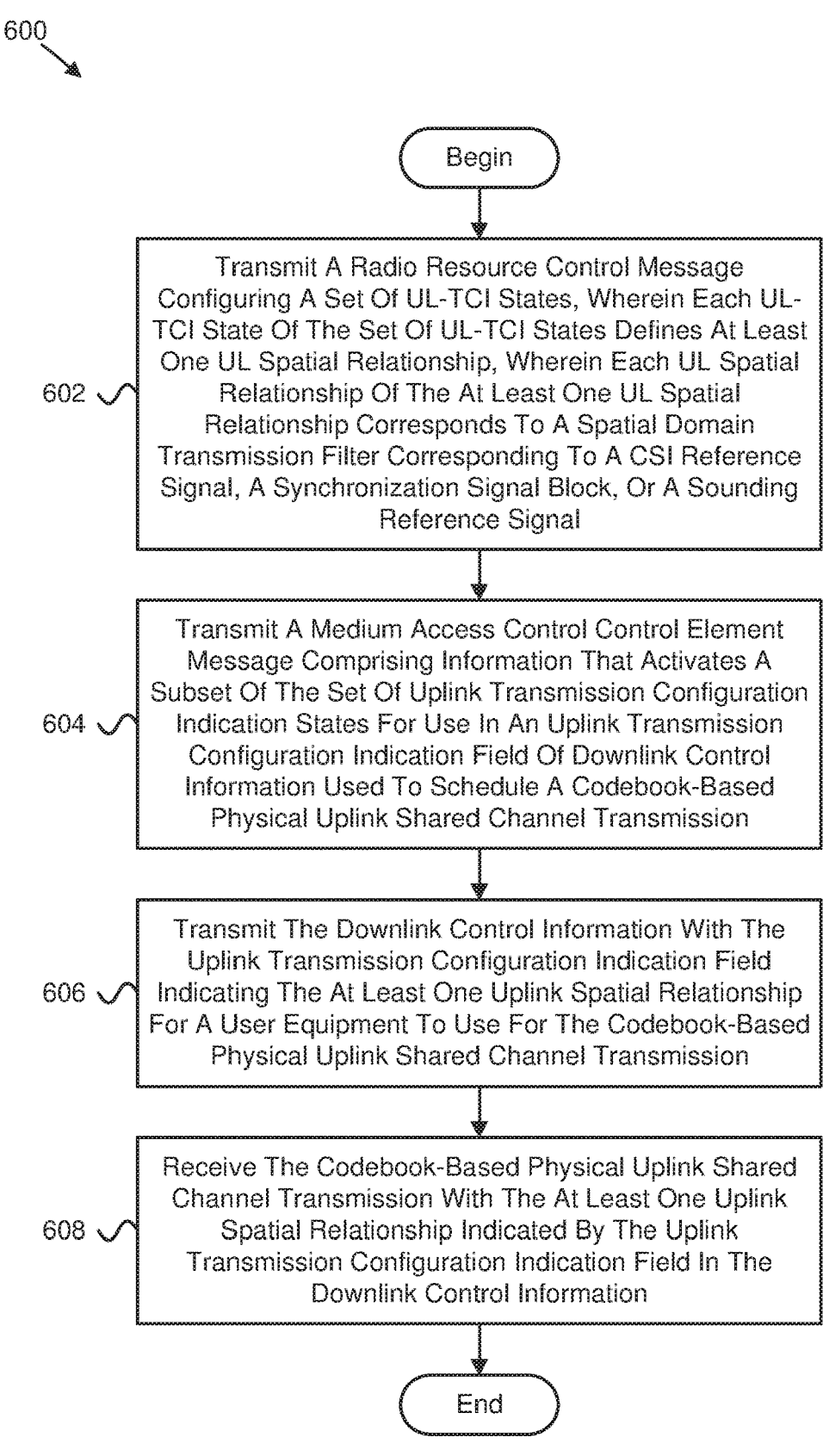

600

Begin

602 — Transmit A Radio Resource Control Message Configuring A Set Of UL-TCI States, Wherein Each UL-TCI State Of The Set Of UL-TCI States Defines At Least One UL Spatial Relationship, Wherein Each UL Spatial Relationship Of The At Least One UL Spatial Relationship Corresponds To A Spatial Domain Transmission Filter Corresponding To A CSI Reference Signal, A Synchronization Signal Block, Or A Sounding Reference Signal 604 — Transmit A Medium Access Control Control Element Message Comprising Information That Activates A Subset Of The Set Of Uplink Transmission Configuration Indication States For Use In An Uplink Transmission Configuration Indication Field Of Downlink Control Information Used To Schedule A Codebook-Based Physical Uplink Shared Channel Transmission 606 — Transmit The Downlink Control Information With The Uplink Transmission Configuration Indication Field Indicating The At Least One Uplink Spatial Relationship For A User Equipment To Use For The Codebook-Based Physical Uplink Shared Channel Transmission 608 — Receive The Codebook-Based Physical Uplink Shared Channel Transmission With The At Least One Uplink Spatial Relationship Indicated By The Uplink Transmission Configuration Indication Field In The Downlink Control Information End

FIG. 6

CONFIGURING UPLINK TRANSMISSION CONFIGURATION INDICATION STATES

FIELD

The subject matter disclosed herein relates generally to wireless communications and more particularly relates to configuring uplink transmission configuration indication states.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), To Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Code Block Group ("CBG"), CBG Flushing Out Information ("CBGFI"), CBG Transmission Information ("CBGTI"), Component Carrier ("CC"), Code Division Multiplexing ("CDM"), Control Element ("CE"), Coordinated Multipoint ("ColVIP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink Feedback Information ("DFI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), High-Speed Train ("HST"), Integrated Access Backhaul ("TAB"), Identity or Identifier or Identification ("ID"), Information Element ("IE"), Interference Measurement ("IM"), International Mobile Subscriber Identity ("IMST"), Internet-of-Things ("MT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Least-Significant Bit ("LSB"), Long Term Evolution ("LTE"), Levels of Automation ("*LoA*"), Medium Access Control ("MAC"), Modulation Coding Scheme ("MCS"), Multi DCI ("M-DCI"), Master Information Block ("MIB"), Multiple Input Multiple Output ("MIMO"), Maximum Permissible Exposure ("MPE"), Most-Significant Bit ("MSB"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Non-Coherent Joint Transmission ("NCJT"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmit Power Control ("TPC"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Virtual Resource Block ("VRB"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, there may be different TCI states.

BRIEF SUMMARY

Methods for configuring uplink transmission configuration indication states are disclosed. Apparatuses and systems also perform the functions of the methods. In one embodiment, the method includes receiving, at a user equipment, a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal. In some embodiments, the method includes receiving a medium access control control element message comprising information that activates a subset of the set of uplink transmission configuration indication states for use in an uplink transmission configuration indication field of downlink control information used to schedule a codebook-based physical uplink shared channel transmission. In certain embodiments, the method includes receiving the downlink control information with the uplink transmission configuration indication field indicating the at least one uplink spatial relationship for the user equipment to use for the codebook-based physical uplink shared channel transmission. In various embodiments, the method includes transmitting the codebook-based physical uplink shared channel transmission with the at least one uplink spatial relationship indicated by the uplink transmission configuration indication field in the downlink control information.

An apparatus for configuring uplink transmission configuration indication states, in one embodiment, includes a receiver that receives a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; receives a medium access control control element message comprising information that activates a subset of the set of uplink transmission configuration indication states for use in an uplink transmission configuration indication field of downlink control information used to schedule a codebook-based physical uplink shared channel transmission; and receives the downlink control information with the uplink transmission configuration indication field indicating the at least one uplink spatial relationship for the user equipment to use for the codebook-based physical uplink shared channel transmission. In some embodiments, the apparatus includes a transmitter that transmits the codebook-based physical uplink shared channel transmission with the at least one uplink spatial relationship indicated by the uplink transmission configuration indication field in the downlink control information.

A method for configuring uplink transmission configuration indication states includes transmitting a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal.

In some embodiments, the method includes transmitting a medium access control control element message comprising information that activates a subset of the set of uplink transmission configuration indication states for use in an uplink transmission configuration indication field of downlink control information used to schedule a codebook-based physical uplink shared channel transmission. In certain embodiments, the method includes transmitting the downlink control information with the uplink transmission configuration indication field indicating the at least one uplink spatial relationship for a user equipment to use for the codebook-based physical uplink shared channel transmission. In various embodiments, the method includes receiving the codebook-based physical uplink shared channel transmission with the at least one uplink spatial relationship indicated by the uplink transmission configuration indication field in the downlink control information.

An apparatus for configuring uplink transmission configuration indication states, in one embodiment, includes a transmitter that transmits a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; transmits a medium access control control element message comprising information that activates a subset of the set of uplink transmission configuration indication states for use in an uplink transmission configuration indication field of downlink control information used to schedule a codebook-based physical uplink shared channel transmission; and transmits the downlink control information with the uplink transmission configuration indication field indicating the at least one uplink spatial relationship for a user equipment to use for the codebook-based physical uplink shared channel transmission. In some embodiments, the apparatus includes a receiver that receives the codebook-based physical uplink shared channel transmission with the at least one uplink spatial relationship indicated by the uplink transmission configuration indication field in the downlink control information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating another embodiment of a method for configuring uplink transmission configuration indication states.

DETAILED DESCRIPTION

Figure 1:
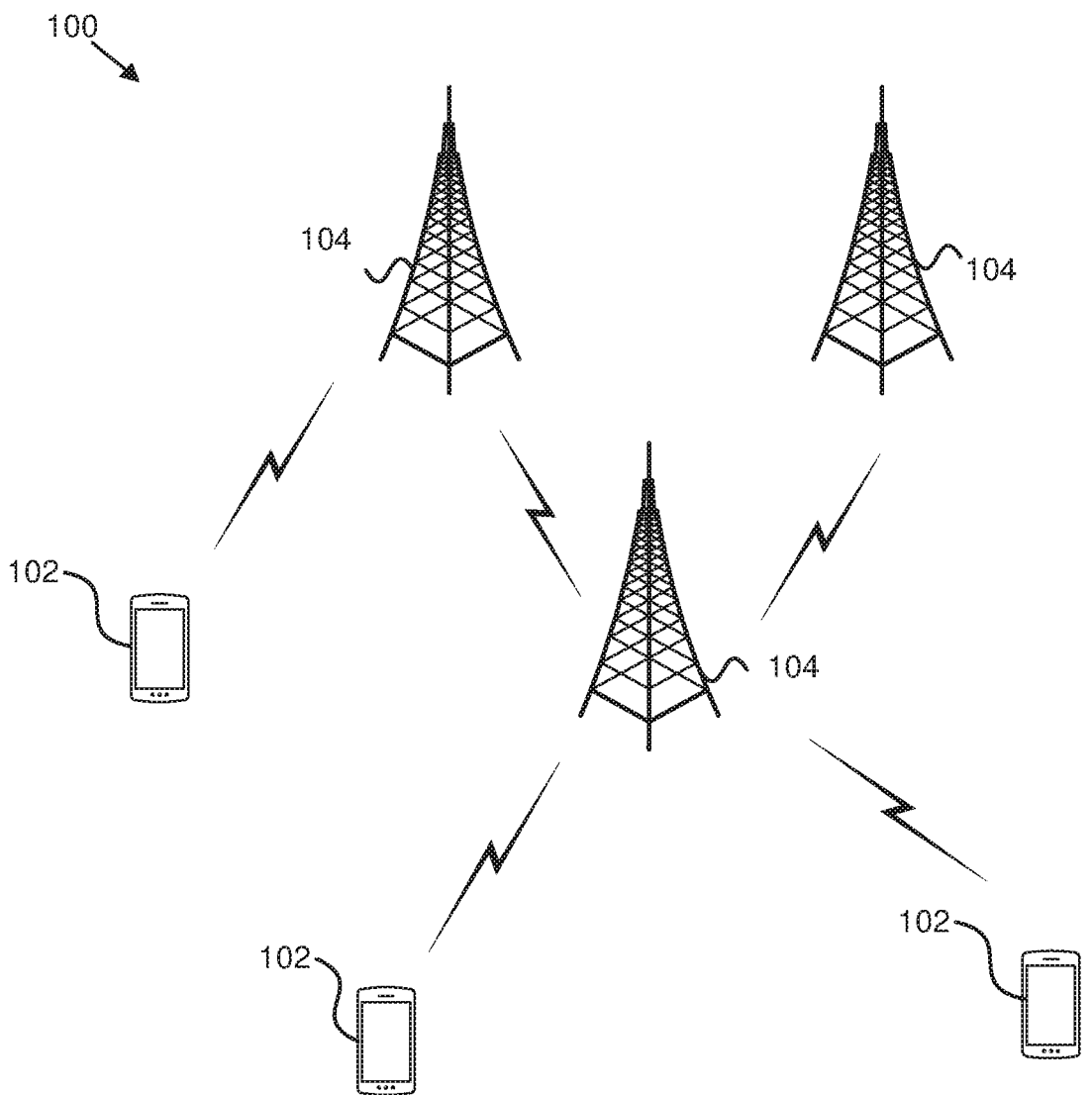
FIG. 1 is a schematic block diagram illustrating one embodiment of a wireless communication system for configuring uplink transmission configuration indication states.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced to without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring uplink transmission configuration indication states. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal. In certain embodiments, the remote unit 102 may receive a medium access control control element message comprising information that activates a subset of the set of uplink transmission configuration indication states for use in an uplink transmission configuration indication field of downlink control information used to schedule a codebook-based physical uplink shared channel transmission. In some embodiments, the remote unit 102 may receive the downlink control information with the uplink transmission configuration indication field indicating the at least one uplink spatial relationship for the user equipment to use for the codebook-based physical uplink shared channel transmission. In various embodiments, the remote unit 102 may transmit the codebook-based physical uplink shared channel transmission with the at least one uplink spatial relationship indicated by the uplink transmission configuration indication field in the downlink control information. Accordingly, a remote unit 102 may be used for configuring uplink transmission configuration indication states.

In some embodiments, a network unit 104 may transmit a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal. In certain embodiments, the network unit 104 may transmit a medium access control control element message comprising information that activates a subset of the set of uplink transmission configuration indication states for use in an uplink transmission configuration indication field of downlink control information used to schedule a codebook-based physical uplink shared channel transmission. In various embodiments, the network unit 104 may transmit the downlink control information with the uplink transmission configuration indication field indicating the at least one uplink spatial relationship for a user equipment to use for the codebook-based physical uplink shared channel transmission. In some embodiments, the network unit 104 may receive the codebook-based physical uplink shared channel transmission with the at least one uplink spatial relationship indicated by the uplink transmission configuration indication field in the downlink control information. Accordingly, a network unit 104 may be used for configuring uplink transmission configuration indication states.

Figure 2:
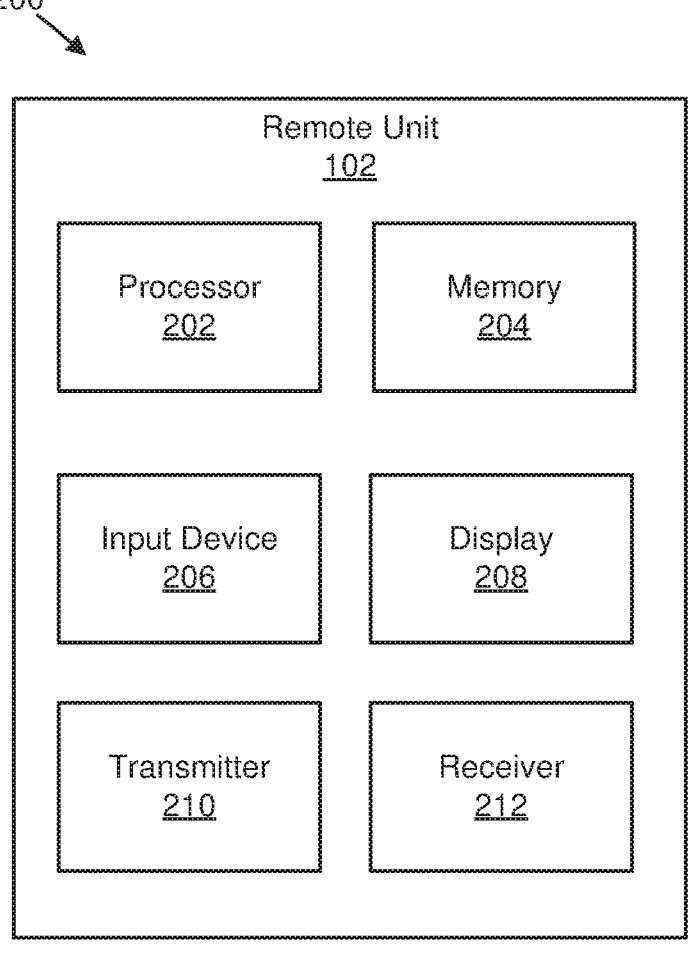
FIG. 2 is a schematic block diagram illustrating one embodiment of an apparatus that may be used for configuring uplink transmission configuration indication states.

FIG. 2 depicts one embodiment of an apparatus 200 that may be used for configuring uplink transmission configuration indication states. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may: receive a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; receive a medium access control control element message comprising information that activates a subset of the set of uplink transmission configuration indication states for use in an uplink transmission configuration indication field of downlink control information used to schedule a codebook-based physical uplink shared channel transmission; and receive the downlink control information with the uplink transmission configuration indication field indicating the at least one uplink spatial relationship for the user equipment to use for the codebook-based physical uplink shared channel transmission. In some embodiments, the transmitter 210 may transmit the codebook-based physical uplink shared channel transmission with the at least one uplink spatial relationship indicated by the uplink transmission configuration indication field in the downlink control information.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
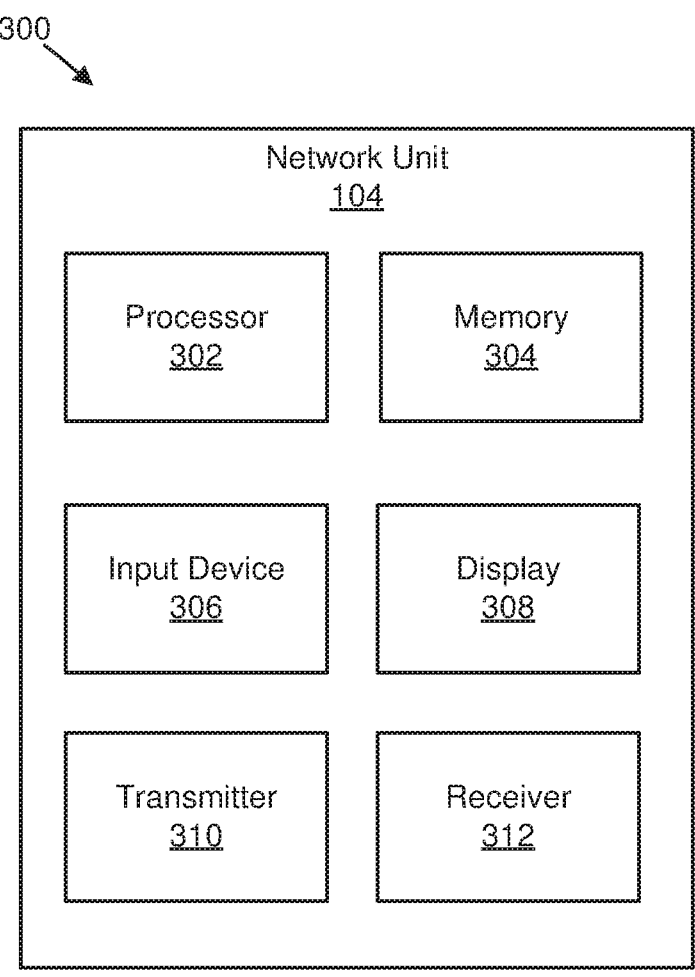
FIG. 3 is a schematic block diagram illustrating one embodiment of an apparatus that may be used for configuring uplink transmission configuration indication states.

FIG. 3 depicts one embodiment of an apparatus 300 that may be used for configuring uplink transmission configuration indication states. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may: transmit a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; transmit a medium access control control element message comprising information that activates a subset of the set of uplink transmission configuration indication states for use in an uplink transmission configuration indication field of downlink control information used to schedule a codebook-based physical uplink shared channel transmission; and transmit the downlink control information with the uplink transmission configuration indication field indicating the at least one uplink spatial relationship for a user equipment to use for the codebook-based physical uplink shared channel transmission. In certain embodiments, the receiver 312 may receive the codebook-based physical uplink shared channel transmission with the at least one uplink spatial relationship indicated by the uplink transmission configuration indication field in the downlink control information.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, a PDSCH DL transmission beam may be indicated in a DCI format 1_1 or 1_2 by a 3-bit TCI field. The indication may enable a gNB to select from possible DL beams (e.g., for single TRP transmission). In some embodiments, such as for single-DCI multi-TRP PDSCH transmissions, DL TCI codepoints may be associated with two different TCI states, one for each TRP.

In certain embodiments, a PUSCH UL transmission beam may be a property of SRS resources and may be changed only if an SRS resource indicated by an SRI field in DCI format 0_1 or 0_2 changes. In various embodiments, such as for codebook based PUSCH, a UE may be configured with 1 SRS resource set with a usage set to "codebook." In such embodiments, the 1 SRS resource set may contain 2 SRS resources with the same number of antenna ports. When these 2 SRS resources are configured with different spatialRelationInfo (e.g., spatial relation information, configured spatial relation information), a gNB may choose a UL TX beam by selecting SRI=0 or SRI=1. Each SRS resource may have its spatialRelationInfo configured by RRC to either a CSI-RS, an SSB, or another SRS, and RRC reconfiguration may be used if the gNB decides to update the spatialRelationInfo of an SRS resource. In some embodiments, to address an issue of full power UL transmission for UEs for which none of the TX power amplification can support full power transmission (e.g., 23 dBm for Class 3 UE), a UE may be configured with up to 4 different SRS resources with a different number of antenna ports. However, the 4 SRS resources may be determined by spatialRelationInfo.

In various embodiments, such as for non-codebook based PUSCH transmission, a UL TX beam may be determined as part of SRI in a DCI field (e.g., part of a property of SRS resources selected for the PUSCH transmission). In certain embodiments, a UE may be configured with a single SRS resource set with a usage set to "nonCodebook." The single SRS resource set may contain up to 4 single port SRS resources. For a periodic or semi-persistent SRS resource set, a gNB may RRC configure the SRS resource set with an associatedCSI-RS. Accordingly, all SRS resources may have the same UL TX beam determined by the associatedCSI-RS. In such embodiments, the gNB may change the UL TX beam of PUSCH by reconfiguring the associatedCSI-RS with an RRC message. In some embodiments, such as for an aperiodic SRS resource set, each SRS resource may be configured with its own spatialRelationInfo. In such embodiments, up to four different UL TX beams may be configured and selected from an SRI field in DCI. Because a UE may only transmit with a single TX beam in PUSCH, if each SRS resource is configured with a different spatialRelationInfo, only one of the SRS resources may be used and a transmission rank may be limited to one. To support up to rank 2, only two spatialRelationInfo may be configured for 4 SRS resources. As may be appreciated, a tradeoff between a flexible UL TX beam and transmission rank may limit use of multiple UL TX beams in PUSCH.

In some embodiments, MIMO may support PUSCH transmission for multi-TRP. In certain embodiments, separate UL TX beams may be configured and used for PUSCH sent to different TRPs. In such embodiments, it may be transparent that the PUSCH is sent to different TRPs at different locations. Furthermore, more UL TX beams may be used to support multi-TRP PUSCH transmission. In various embodiments, a number of usable TX beams may be limited. In some embodiments, multiple UL TX beams may be supported to support multi-TRP PUSCH transmission.

In certain embodiments, such as for both codebook-based and non-codebook-based PUSCH, a dynamic change of an UL TX beam by a gNB may be limited as compared with PDSCH. In various embodiments, to support multi-beam communications, such as to support transmission to multiple TRPs, a flexible UL beam indication scheme for PUSCH may be used. In various embodiments, an UL TX beam for PUSCH for a UE in codebook-based transmission may be dynamically changed.

In some embodiments, to enable a flexible UL TX beam for PUSCH, an UL-TCI field may be used in a DCI format to dynamically indicate a TX beam for codebook-based PUSCH transmission. In certain embodiments, if UL-TCI is enabled in a DCI format scheduling a PUSCH, a number (e.g., M) of UL-TCI states may be configured for a UE in a BWP of a cell by RRC. In such embodiments, each UL-TCI state may be associated with a RS to be used as a spatial domain TX filter for an UL TX beam. The RS may be a DL CSI-RS, a DL SSB, or an UL SRS. An example of an UL SRS may be an SRS resource for beam management. Out of M UL-TCI states, a subset of the M UL-TCI states may be activated for a UE with a MAC-CE message for use at any time. In various embodiments, a K bit UL-TCI field (e.g., K=3) may be part of a DCI format (e.g., DCI format 0_1 or 0_2) to indicate an UL TX beam a UE should use for a transmission. In such embodiments, up to $2^K$ UL-TCI states may be mapped to an UL-TCI codepoint in DCI. In various embodiments, if a UE receives a DCI format (e.g., DCI format 0_1 or 0_2) with an UL TCI field indicating an activated UL-TCI state, the UE may apply the same spatial domain TX filter of an UL beam indicated by the UL-TCI state (e.g., as defined in an associated DL RS or UL RS) to a PUSCH transmission. In some embodiments, although an SRS resource indicated by an SRI field of the same DCI may have its UL spatialRelationInfo configured in RRC, a spatial domain TX filter indicated by an UL-TCI field may be used instead. In such embodiments, a precoder indicated by a TPMI field of DCI may be applied to SRS ports. In certain embodiments, if a UL-TCI field of DCI points to a UL-TCI state that has not been activated by a MAC CE, a TX spatial filter of an SRS resource as configured in its spatialRelationInfo may be used. In various embodiments, default TX beam usage (e.g., fall back to spatialRelationInfo of an SRS if an UL-TCI state is not activated by MAC-CE) may be achieved by two methods: 1) if a gNB indicates a UL-TCI codepoint in DCI that is undefined or deactivated by MAC-CE, a UE may use the spatialRelationInfo of the SRS resource indicated by an SRI field as UL TX spatial filter; or 2) one of a UL-TCI codepoints (e.g., such as 0×7) may be reserved for the gNB to signal to the UE to use the spatialRelationInfo of the SRS resource indicated by the SRI field as the UL TX spatial filter—the UE is not expected to receive an UL-TCI field in the DCI pointing to a codepoint that is neither activated by the MAC-CE nor is the reserved value (e.g., 0x7).

In some embodiments, if an SRS resource with usage=codebook is not configured with spatialRelationInfo, a UE may use a spatial filter used for receiving PDCCH carrying DCI instead of its spatialRelationInfo if sending a PUSCH.

In various embodiments, if the SRS resource with usage=codebook is not configured with spatialRelationInfo, a UE uses a spatial filter it uses for receiving a latest PDCCH from a CORESET0 or a CORESET with a lowest ID in place of its spatialRelationInfo if sending a PUSCH.

Figure 4:
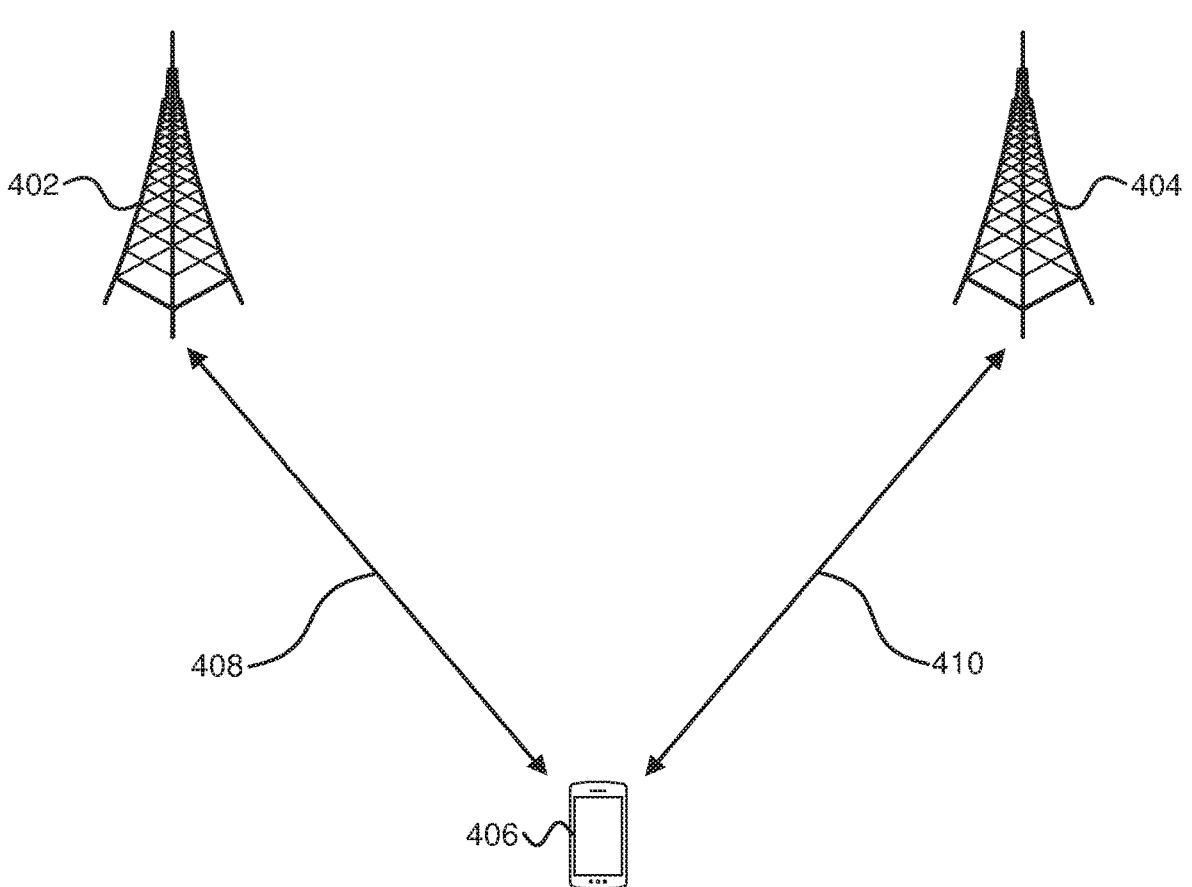
FIG. 4 is a schematic block diagram of a system illustrating one embodiment of a configuration of UL-TCI states.

FIG. 4 is a schematic block diagram of a system 400 illustrating one embodiment of a configuration of UL-TCI states. The system 400 includes a first TRP 402 ("TRP1"), a second TRP 404 ("TRP2"), and a UE 406. The first TRP 402 communicates with the UE 406 via first communications 408, and the second TRP 404 communicates with the UE 406 via second communications 410. The first communications 408 may configure one or more of the following UL-TCI states: SRS1, SRS2, CSI-RS1, and CSI-RS2. The second communications 410 may configure one or more of the following UL-TCI-states: SRS3, SRS4, CSI-RS3, and CSI-RS4.

In FIG. 4, there are a total of 8 DL and UL TCI states configured in RRC. Specifically, there are two CORESET-PoolIndex (0 and 1) configured for the CORESETs that are transmitted from TRP1 and TRP2. These CORESET-POOLIndex are used to distinguish the CORESETs that are transmitted from the TRPs to schedule a PUSCH transmission. Furthermore, PDCCH transmissions sent from TRP1 use CORESETs with CORESETPOOLIndex=0, and PDCCH transmissions sent from TRP2 use CORESETs with CORESETPOOLIndex=1. Moreover, the PUSCH is configured with txConfig=codebook. In addition, in SRS-Config, a first SRS resource set includes two SRS resources: {SRS1, SRS3} with usage=codebook. SRS1 and SRS3 are configured with spatialRelationInfo) and spatialRelationInfo3 respectively. Furthermore, there are two SRS resource sets each including one SRS resources: {SRS2}, {SRS4} with usage=beamManagement. Moreover, there are four CSI-RS resources {CSI-RS1, CSI-RS2, CSI-RS3, CSI-RS4}. In addition, an RRC configuration of UL-TCI-states 0 to 5 are configured with the following RS: {UL-TCI-State0: CSI-RS1}, {UL-TCI-State1: CSI-RS2}, {UL-TCI-State2: CSI-RS3}, {UL-TCI-State3: CSI-RS4}, {UL-TCI-State4: SRS2}, {UL-TCI-State5: SRS4}.

In some embodiments, there are two modes for scheduling PUSCH. In a first mode PUSCH may be scheduled by each TRP individually and sent to the scheduling TRP through the corresponding UL beam, and in a second mode PUSCH may be scheduled by any TRP and sent to any TRP. The first mode may apply if TRPs are connected by a non-ideal backhaul and each TRP schedules its own PUSCH transmissions. The second mode may apply if TRPs are connected with an ideal backhaul and a scheduling TRP dynamically decides to have the PUSCH transmissions sent to any TRP, multiple TRPs, or all TRPs.

In certain embodiments of the first mode, each TRP schedules its own PUSCH transmission with its own DCI. The CORESETs transmitted by TRP1 and TRP2 may be configured with CORESETPOOLIndex0 (e.g., as illustrated in Table 1) and CORESETPOOLIndex1 (e.g., as illustrated in Table 2).

In various embodiments, a set of UL-TCI states may be defined in RRC for a UE. For each CORESETPOOLIndex, a gNB sends a MAC-CE message (e.g., activation message) to the UE to activate a set of UL-TCI states. The MAC-CE message includes a bit to indicate the CORESETPOOLIndex it corresponds to. After the UE receives a new MAC-CE message, the UE overwrites a previous setting.

Based on the MAC-CE message received, for CORESET-POOLIndex0 the UE 406 is configured with UL-TCI states shown in Table 1, and for CORESETPOOLIndex1 the UE 406 is configured with UL-TCI states shown in Table 2.

TABLE 1

| UL-TCI codepoint for CORESETPOOLIndex0 | UL-TCI state |
|---|---|
| 0 | CSI-RS1 |
| 1 | CSI-RS2 |
| 2 | SRS2 |
| 3-7 | Not configured |

TABLE 2

| UL-TCI codepoint for CORESETPOOLIndex1 | UL-TCI state |
|---|---|
| 0 | CSI-RS3 |
| 1 | CSI-RS4 |
| 2 | SRS4 |
| 3-7 | Not configured |

In some embodiments of the first mode, if TRP1 sends the UE 406 a DCI format (e.g., DCI format 0_1 or 0_2) using a CORESET configured with CORESETPOOLIndex0, the UE 406 uses a spatial transmission filter corresponding to CSI-RS1, CSI-RS2, and/or SRS2 to send a PUSCH transmission if a UL-TCI field in DCI is 0, 1, or 2. Otherwise the UE 406 uses the spatial transmission filter corresponding to spatialRelationInfo of the SRS resource indicated by an SRI field for the transmission. If the SRI=0, the corresponding SRS resource is SRS1 and spatialRelationInfo1 is used as the spatial transmission filter for a PUSCH transmission.

In various embodiments of the first mode, if TRP2 sends the UE 406 a DCI format (e.g., DCI format 0_1 or 0_2) using a CORESET configured with CORESETPOOLIndex1, the UE 406 uses a spatial transmission filter corresponding to CSI-RS3, CSI-RS4, and/or SRS4 to send a PUSCH transmission if a UL-TCI field in DCI is 0, 1, or 2. Otherwise the UE 406 uses the spatial transmission filter corresponding to spatialRelationInfo of the SRS resource indicated by an SRI field for the transmission. If the SRI=1, the corresponding SRS resource is SRS3 and spatialRelationInfo3 is used as the spatial transmission filter for a PUSCH transmission.

In certain embodiments of the first mode, the UE 406 uses spatialRelationInfo of an SRS resource indicated by an SRI field only if the UL-TCI field in DCI is not configured (e.g., 0×3, 0×4, 0×5, 0×6, 0×7) or is configured with a predetermined value (e.g., 0×7). In such embodiments, the UE 406 uses spatialRelationInfo1 or spatialRelationInfo3 as a spatial transmission filter for a PUSCH transmission if the CORESET in which the DCI is transmitted has a CORESETPOOLIndex configured as CORESETPOOLIndex0 or CORESETPOOLIndex1, respectively.

In some embodiments of the second mode, a single TRP transmits all PDCCH transmissions to the UE 406. The CORESETs carrying a PDCCH transmission is either not configured with a CORESETPOOLIndex, or are all configured with CORESETPOOLIndex0.

In one example, only a single set of UL-TCI states are activated for the UE 406 by a MAC-CE message. Table 3 shows one example of MAC-CE activated UL-TCI codepoints. Some of the UL-TCI codepoints (2 and 3) have 2 UL spatial relationships represented by 2 CSI-RS resources.

TABLE 3

| UL-TCI codepoint | UL-TCI state |
|---|---|
| 0 | CSI-RS1 |
| 1 | CSI-RS2 |
| 2 | CSI-RS3, CSI-RS4 |
| 3 | CSI-RS5, CSI-RS6 |
| 4 | SRS2 |
| 5 | SRS4 |
| 6-7 | Not configured |

In various embodiments, if the UE 406 receives a DCI with UL-TCI=1, the UE 406 may use a spatial domain filter the UE 406 uses for receiving CSI-RS2 as its spatial domain transmission filter for a PUSCH transmission. The PUSCH may be sent to TRP1. If the UE 406 receives DCI with UL-TCI=3, it sends the PUSCH using the two UL spatial relationships (CSI-RS5, CSI-RS6). The DCI scheduling the PUSCH contains information on how the two UL spatial relationships are used to transmit to both TRP1 and TRP2, the CSI-RS5 is used as the first spatial relationship, and CSI-RS6 is used as the second spatial relationship. If the UE 406 receives DCI with UL-TCI=5, the UE 406 may use the spatial domain transmission filter of SRS4 to transmit the PUSCH transmission to TRP2. In certain embodiments, if receiving DCI with UL-TCI=7 and SRI=0, the UE 406 transmits the PUSCH transmission with the spatial domain transmission filter of spatialRelationInfo1. In some embodiments, if receiving DCI with UL-TCI=7 and SRI=1, the UE 406 transmits the PUSCH transmission with the spatial domain transmission filter of spatialRelationInfo3. In various embodiments, if receiving a DCI with UL-TCI=7 and SRI=1, and the spatialRelationInfo for SRS3 is not configured, the UE 406 transmits the PUSCH transmission with an RX filter the UE 406 uses for the CORESET for which the UE 406 receives the DCI. In this example, since the DCI is transmitted from TRP1, the PUSCH transmission is also sent to TRP1.

In various embodiments, an UL-TCI may define one, two, or more UL spatial relationships. Each UL spatial relationship may correspond to a spatial domain transmission filter. For example, an UL-TCI may define a spatial domain transmission filter for the UE 406 to use for transmissions to both of TRP1 (e.g., part of first communications 408) and TRP2 (e.g., part of second communications 410).

In certain embodiments, it may take time for the UE 406 to prepare a TX beam used for a PUSCH transmission. For a UE equipped with more than one panel, if the UE 406 needs to switch to another antenna panel to transmit with a new beam, the switching time may be longer than if it did not have to switch to another antenna panel. For example, let $T_D$ be a time from a last symbol of DCI scheduling a PUSCH transmission to a first symbol of PUSCH as determined from a time domain resource assignment field in the DCI, and let $T_S$ be a time needed for the UE 406 to switch transmission beams. In such an example, one or two values of Ts may be defined in terms of OFDM symbol duration for each sub-carrier spacing for FR2 as a UE capability transmitted from the UE to one or more TRPs. If two values are provided in the UE capability, the first value may be the time required for the UE 406 to prepare a TX beam without switching to a different antenna panel (or SRS group), and the second value may be the time required for the UE 406 to prepare a TX beam and switch to a different antenna panel. If a single value is provided in the UE capability, the single value is applied to cases with or without antenna panel switching. In certain embodiments, the UE 406 uses a proper value for $T_S$ based on a reported capability and scheduling DCI. If $T_D < T_S$, the UE 406 may not have sufficient time to prepare a spatial transmission filter indicated by UL-TCI. If this occurs, the UE 406 may apply spatialRelationInfo of an SRS resource indicated by an SRI field in DCI even if the UL-TCI field indicates a valid (e.g., activated) UL-TCI state. If $T_D \geq T_S$, the UE 406 may apply a spatial domain transmission filter indicated by the UL-TCI field, the SRS resource, or the PDCCH carrying the DCI.

Figure 5:
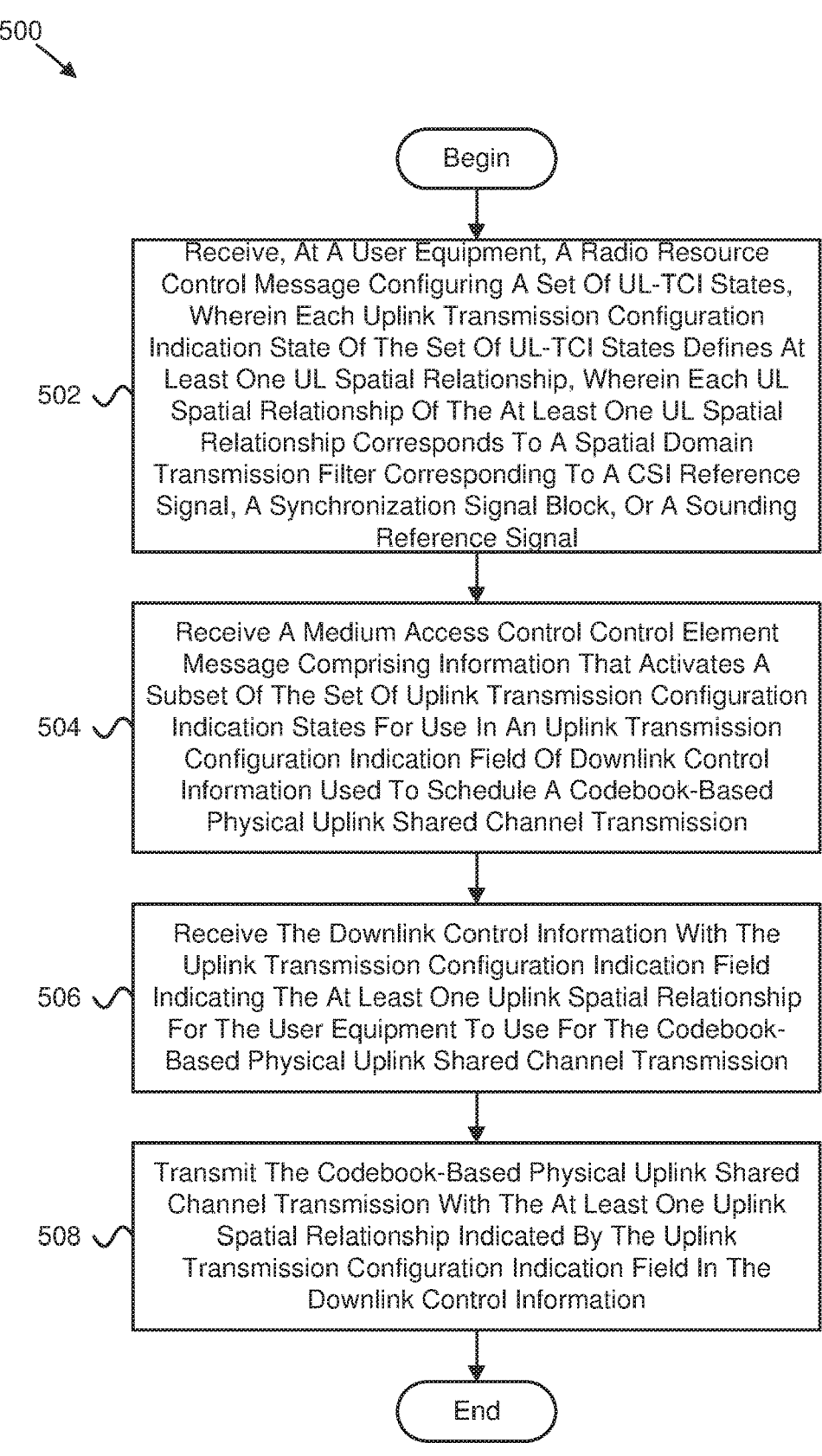
FIG. 5 is a flow chart diagram illustrating one embodiment of a method for configuring uplink transmission configuration indication states.

FIG. 5 is a schematic flow chart diagram illustrating one embodiment of a method 500 for configuring uplink transmission configuration indication states. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502, at a user equipment (e.g., remote unit 102), a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal. In certain embodiments, the method 500 may include receiving 504 a medium access control control element message comprising information that activates a subset of the set of uplink transmission configuration indication states for use in an uplink transmission configuration indication field of downlink control information used to schedule a codebook-based physical uplink shared channel transmission. In some embodiments, the method 500 may include receiving 506 the downlink control information with the uplink transmission configuration indication field indicating the at least one uplink spatial relationship for the user equipment to use for the codebook-based physical uplink shared channel transmission. In various embodiments, the method 500 may include transmitting 508 the codebook-based physical uplink shared channel transmission with the at least one uplink spatial relationship indicated by the uplink transmission configuration indication field in the downlink control information.

In certain embodiments, the method 500 further comprises using spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint. In some embodiments, the method 500 further comprises using a spatial domain filter that receives the downlink control information for transmitting the codebook-based physical uplink shared channel transmission if the spatial relation information for the sounding reference signal resource is not configured. In various embodiments, the method 500 further comprises determining the spatial domain filter for the codebook-based physical uplink shared channel transmission based on a control resource set pool index of a control resource set used to receive the downlink control information.

In one embodiment, the method 500 further comprises using a spatial domain filter that receives a control resource set if the spatial relation information for the sounding reference signal resource is not configured. In certain embodiments, the method 500 further comprises using a spatial domain filter that receives a control resource set with a lowest control resource set identifier configured on a carrier to transmit the codebook-based physical uplink shared channel transmission if the spatial relation information for the sounding reference signal resource is not configured. In some embodiments, the medium access control control element message activates an uplink transmission configuration indication for each control resource set pool index of a plurality of control resource set pool indexes separately.

In various embodiments, the method 500 further comprises determining an uplink transmission configuration indication state to use based on an uplink transmission configuration indication field and the control resource set pool index of a control resource set used to receive the downlink control information. In one embodiment, the method 500 further comprises reporting, to a network unit, a capability report of the user equipment, wherein the capability report comprises at least one time threshold value used to prepare the at least one uplink spatial relationship for the codebook-based physical uplink shared channel transmission. In certain embodiments, the method 500 further comprises determining the at least one time threshold value based on the downlink control information. In some embodiments, the method 500 further comprises, in response to a time duration between the downlink control information and the codebook-based physical uplink shared channel transmission being less than the at least one time threshold, using spatial relation information configured for a sounding reference signal resource indicated by a sounding reference signal resource index field of the downlink control information.

FIG. 6 is a schematic flow chart diagram illustrating one embodiment of a method 600 for configuring uplink transmission configuration indication states. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal. In certain embodiments, the method 600 may include transmitting 604 a medium access control control element message comprising information that activates a subset of the set of uplink transmission configuration indication states for use in an uplink transmission configuration indication field of downlink control information used to schedule a codebook-based physical uplink shared channel transmission. In some embodiments, the method 600 may include transmitting 606 the downlink control information with the uplink transmission configuration indication field indicating the at least one uplink spatial relationship for a user equipment (e.g., remote unit 102) to use for the codebook-based physical uplink shared channel transmission. In various embodiments, the method 600 may include receiving 608 the codebook-based physical uplink shared channel transmission with the at least one uplink spatial relationship indicated by the uplink transmission configuration indication field in the downlink control information.

In certain embodiments, the user equipment uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint. In some embodiments, the user equipment uses a spatial domain filter that receives the downlink control information for transmitting the codebook-based physical uplink shared channel transmission if the spatial relation information for the sounding reference signal resource is not configured. In various embodiments, the user equipment determines the spatial domain filter for the codebook-based physical uplink shared channel transmission based on a control resource set pool index of a control resource set used to receive the downlink control information.

In one embodiment, the user equipment uses a spatial domain filter that receives a control resource set if the spatial relation information for the sounding reference signal resource is not configured. In certain embodiments, the user equipment uses a spatial domain filter that receives a control resource set with a lowest control resource set identifier configured on a carrier to transmit the codebook-based physical uplink shared channel transmission if the spatial relation information for the sounding reference signal resource is not configured. In some embodiments, the medium access control control element message activates an uplink transmission configuration indication for each control resource set pool index of a plurality of control resource set pool indexes separately.

In various embodiments, the user equipment determines an uplink transmission configuration indication state to use based on an uplink transmission configuration indication field and the control resource set pool index of a control resource set used to receive the downlink control information. In one embodiment, the method 600 further comprises receiving a capability report of the user equipment, wherein the capability report comprises at least one time threshold value used to prepare the at least one uplink spatial relationship for the codebook-based physical uplink shared channel transmission. In certain embodiments, the user equipment determines the at least one time threshold value based on the downlink control information. In some embodiments, the user equipment, in response to a time duration between the downlink control information and the codebook-based physical uplink shared channel transmission being less than the at least one time threshold, uses spatial relation information configured for a sounding reference signal resource indicated by a sounding reference signal resource index field of the downlink control information.

In one embodiment, a method comprises: receiving, at a user equipment, a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; receiving a medium access control control element message comprising information that activates a subset of the set of uplink transmission configuration indication states for use in an uplink transmission configuration indication field of downlink control information used to schedule a codebook-based physical uplink shared channel transmission; receiving the downlink control information with the uplink transmission configuration indication field indicating the at least one uplink spatial relationship for the user equipment to use for the codebook-based physical uplink shared channel transmission; and transmitting the codebook-based physical uplink shared channel transmission with the at least one uplink spatial relationship indicated by the uplink transmission configuration indication field in the downlink control information.

In certain embodiments, the method further comprises using spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

In some embodiments, the method further comprises using a spatial domain filter that receives the downlink control information for transmitting the codebook-based physical uplink shared channel transmission if the spatial relation information for the sounding reference signal resource is not configured.

In various embodiments, the method further comprises determining the spatial domain filter for the codebook-based physical uplink shared channel transmission based on a control resource set pool index of a control resource set used to receive the downlink control information.

In one embodiment, the method further comprises using a spatial domain filter that receives a control resource set if the spatial relation information for the sounding reference signal resource is not configured.

In certain embodiments, the method further comprises using a spatial domain filter that receives a control resource set with a lowest control resource set identifier configured on a carrier to transmit the codebook-based physical uplink shared channel transmission if the spatial relation information for the sounding reference signal resource is not configured.

In some embodiments, the medium access control control element message activates an uplink transmission configuration indication for each control resource set pool index of a plurality of control resource set pool indexes separately.

In various embodiments, the method further comprises determining an uplink transmission configuration indication state to use based on an uplink transmission configuration indication field and the control resource set pool index of a control resource set used to receive the downlink control information.

In one embodiment, the method further comprises reporting, to a network unit, a capability report of the user equipment, wherein the capability report comprises at least one time threshold value used to prepare the at least one uplink spatial relationship for the codebook-based physical uplink shared channel transmission.

In certain embodiments, the method further comprises determining the at least one time threshold value based on the downlink control information.

In some embodiments, the method further comprises, in response to a time duration between the downlink control information and the codebook-based physical uplink shared channel transmission being less than the at least one time threshold, using spatial relation information configured for a sounding reference signal resource indicated by a sounding reference signal resource index field of the downlink control information.

In one embodiment, an apparatus comprising a user equipment, the apparatus comprises: a receiver that: receives a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; receives a medium access control control element message comprising information that activates a subset of the set of uplink transmission configuration indication states for use in an uplink transmission configuration indication field of downlink control information used to schedule a codebook-based physical uplink shared channel transmission; and receives the downlink control information with the uplink transmission configuration indication field indicating the at least one uplink spatial relationship for the user equipment to use for the codebook-based physical uplink shared channel transmission; and a transmitter that transmits the codebook-based physical uplink shared channel transmission with the at least one uplink spatial relationship indicated by the uplink transmission configuration indication field in the downlink control information.

In certain embodiments, the apparatus further comprises a processor that uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

In some embodiments, the processor uses a spatial domain filter that receives the downlink control information for transmitting the codebook-based physical uplink shared channel transmission if the spatial relation information for the sounding reference signal resource is not configured.

In various embodiments, the processor determines the spatial domain filter for the codebook-based physical uplink shared channel transmission based on a control resource set pool index of a control resource set used to receive the downlink control information.

In one embodiment, the processor uses a spatial domain filter that receives a control resource set if the spatial relation information for the sounding reference signal resource is not configured.

In certain embodiments, the processor uses a spatial domain filter that receives a control resource set with a lowest control resource set identifier configured on a carrier to transmit the codebook-based physical uplink shared channel transmission if the spatial relation information for the sounding reference signal resource is not configured.

In some embodiments, the medium access control control element message activates an uplink transmission configuration indication for each control resource set pool index of a plurality of control resource set pool indexes separately.

In various embodiments, the apparatus further comprises a processor that determines an uplink transmission configuration indication state to use based on an uplink transmission configuration indication field and the control resource set pool index of a control resource set used to receive the downlink control information.

In one embodiment, the transmitter reports, to a network unit, a capability report of the user equipment, wherein the capability report comprises at least one time threshold value used to prepare the at least one uplink spatial relationship for the codebook-based physical uplink shared channel transmission.

In certain embodiments, the apparatus further comprises a processor that determines the at least one time threshold value based on the downlink control information.

In some embodiments, the processor, in response to a time duration between the downlink control information and the codebook-based physical uplink shared channel transmission being less than the at least one time threshold, uses spatial relation information configured for a sounding reference signal resource indicated by a sounding reference signal resource index field of the downlink control information.

In one embodiment, a method comprises: transmitting a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; transmitting a medium access control control element message comprising information that activates a subset of the set of uplink transmission configuration indication states for use in an uplink transmission configuration indication field of downlink control information used to schedule a codebook-based physical uplink shared channel transmission; transmitting the downlink control information with the uplink transmission configuration indication field indicating the at least one uplink spatial relationship for a user equipment to use for the codebook-based physical uplink shared channel transmission; and receiving the codebook-based physical uplink shared channel transmission with the at least one uplink spatial relationship indicated by the uplink transmission configuration indication field in the downlink control information.

In certain embodiments, the user equipment uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

In some embodiments, the user equipment uses a spatial domain filter that receives the downlink control information for transmitting the codebook-based physical uplink shared channel transmission if the spatial relation information for the sounding reference signal resource is not configured.

In various embodiments, the user equipment determines the spatial domain filter for the codebook-based physical uplink shared channel transmission based on a control resource set pool index of a control resource set used to receive the downlink control information.

In one embodiment, the user equipment uses a spatial domain filter that receives a control resource set if the spatial relation information for the sounding reference signal resource is not configured.

In certain embodiments, the user equipment uses a spatial domain filter that receives a control resource set with a lowest control resource set identifier configured on a carrier to transmit the codebook-based physical uplink shared channel transmission if the spatial relation information for the sounding reference signal resource is not configured.

In some embodiments, the medium access control control element message activates an uplink transmission configuration indication for each control resource set pool index of a plurality of control resource set pool indexes separately.

In various embodiments, the user equipment determines an uplink transmission configuration indication state to use based on an uplink transmission configuration indication field and the control resource set pool index of a control resource set used to receive the downlink control information.

In one embodiment, the method further comprises receiving a capability report of the user equipment, wherein the capability report comprises at least one time threshold value used to prepare the at least one uplink spatial relationship for the codebook-based physical uplink shared channel transmission.

In certain embodiments, the user equipment determines the at least one time threshold value based on the downlink control information.

In some embodiments, the user equipment, in response to a time duration between the downlink control information and the codebook-based physical uplink shared channel transmission being less than the at least one time threshold, uses spatial relation information configured for a sounding reference signal resource indicated by a sounding reference signal resource index field of the downlink control information.

In one embodiment, an apparatus comprises: a transmitter that: transmits a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal; transmits a medium access control control element message comprising information that activates a subset of the set of uplink transmission configuration indication states for use in an uplink transmission configuration indication field of downlink control information used to schedule a codebook-based physical uplink shared channel transmission; and transmits the downlink control information with the uplink transmission configuration indication field indicating the at least one uplink spatial relationship for a user equipment to use for the codebook-based physical uplink shared channel transmission; and a receiver that receives the codebook-based physical uplink shared channel transmission with the at least one uplink spatial relationship indicated by the uplink transmission configuration indication field in the downlink control information.

In certain embodiments, the user equipment uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

In some embodiments, the user equipment uses a spatial domain filter that receives the downlink control information for transmitting the codebook-based physical uplink shared channel transmission if the spatial relation information for the sounding reference signal resource is not configured.

In various embodiments, the user equipment determines the spatial domain filter for the codebook-based physical uplink shared channel transmission based on a control resource set pool index of a control resource set used to receive the downlink control information.

In one embodiment, the user equipment uses a spatial domain filter that receives a control resource set if the spatial relation information for the sounding reference signal resource is not configured.

In certain embodiments, the user equipment uses a spatial domain filter that receives a control resource set with a lowest control resource set identifier configured on a carrier to transmit the codebook-based physical uplink shared channel transmission if the spatial relation information for the sounding reference signal resource is not configured.

In some embodiments, the medium access control control element message activates an uplink transmission configuration indication for each control resource set pool index of a plurality of control resource set pool indexes separately.

In various embodiments, the user equipment determines an uplink transmission configuration indication state to use based on an uplink transmission configuration indication field and the control resource set pool index of a control resource set used to receive the downlink control information.

In one embodiment, the receiver receives a capability report of the user equipment, wherein the capability report comprises at least one time threshold value used to prepare the at least one uplink spatial relationship for the codebook-based physical uplink shared channel transmission.

In certain embodiments, the user equipment determines the at least one time threshold value based on the downlink control information.

In some embodiments, the user equipment, in response to a time duration between the downlink control information and the codebook-based physical uplink shared channel transmission being less than the at least one time threshold, uses spatial relation information configured for a sounding reference signal resource indicated by a sounding reference signal resource index field of the downlink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:

receiving, at a user equipment, a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal;

receiving a medium access control control element message comprising information that activates a subset of the set of uplink transmission configuration indication states for use in an uplink transmission configuration indication field of downlink control information used to schedule a codebook-based physical uplink shared channel transmission;

receiving the downlink control information with the uplink transmission configuration indication field indicating the at least one uplink spatial relationship for the user equipment to use for the codebook-based physical uplink shared channel transmission; and transmitting the codebook-based physical uplink shared channel transmission with the at least one uplink spatial relationship indicated by the uplink transmission configuration indication field in the downlink control information.

2. An apparatus comprising a user equipment, the apparatus comprising:

a receiver that:

receives a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal;

receives a medium access control control element message comprising information that activates a subset of the set of uplink transmission configuration indication states for use in an uplink transmission configuration indication field of downlink control information used to schedule a codebook-based physical uplink shared channel transmission; and receives the downlink control information with the uplink transmission configuration indication field indicating the at least one uplink spatial relationship for the user equipment to use for the codebook-based physical uplink shared channel transmission; and a transmitter that transmits the codebook-based physical uplink shared channel transmission with the at least one uplink spatial relationship indicated by the uplink transmission configuration indication field in the downlink control information.

3. The apparatus of claim 2, further comprising a processor that uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

4. The apparatus of claim 3, wherein the processor uses a spatial domain filter that receives the downlink control information for transmitting the codebook-based physical uplink shared channel transmission if the spatial relation information for the sounding reference signal resource is not configured.

5. The apparatus of claim 4, wherein the processor determines the spatial domain filter for the codebook-based physical uplink shared channel transmission based on a control resource set pool index of a control resource set used to receive the downlink control information.

6. The apparatus of claim 3, wherein the processor uses a spatial domain filter that receives a control resource set if the spatial relation information for the sounding reference signal resource is not configured.

7. The apparatus of claim 3, wherein the processor uses a spatial domain filter that receives a control resource set with a lowest control resource set identifier configured on a carrier to transmit the codebook-based physical uplink shared channel transmission if the spatial relation information for the sounding reference signal resource is not configured.

8. The apparatus of claim 2, wherein the medium access control control element message activates an uplink transmission configuration indication for each control resource set pool index of a plurality of control resource set pool indexes separately.

9. The apparatus of claim 8, further comprising a processor that determines an uplink transmission configuration indication state to use based on an uplink transmission configuration indication field and the control resource set pool index of a control resource set used to receive the downlink control information.

10. The apparatus of claim 2, wherein the transmitter reports, to a network unit, a capability report of the user equipment, wherein the capability report comprises at least one time threshold value used to prepare the at least one uplink spatial relationship for the codebook-based physical uplink shared channel transmission.

11. The apparatus of claim 10, further comprising a processor that determines the at least one time threshold value based on the downlink control information.

12. The apparatus of claim 11, wherein the processor, in response to a time duration between the downlink control information and the codebook-based physical uplink shared channel transmission being less than the at least one time threshold, uses spatial relation information configured for a sounding reference signal resource indicated by a sounding reference signal resource index field of the downlink control information.

13. An apparatus comprising:

a transmitter that:

transmits a radio resource control message configuring a set of uplink transmission configuration indication states, wherein each uplink transmission configuration indication state of the set of uplink transmission configuration indication states defines at least one uplink spatial relationship, wherein each uplink spatial relationship of the at least one uplink spatial relationship corresponds to a spatial domain transmission filter corresponding to a channel state information reference signal, a synchronization signal block, or a sounding reference signal;

transmits a medium access control control element message comprising information that activates a subset of the set of uplink transmission configuration indication states for use in an uplink transmission configuration indication field of downlink control information used to schedule a codebook-based physical uplink shared channel transmission; and transmits the downlink control information with the uplink transmission configuration indication field indicating the at least one uplink spatial relationship for a user equipment to use for the codebook-based physical uplink shared channel transmission; and a receiver that receives the codebook-based physical uplink shared channel transmission with the at least one uplink spatial relationship indicated by the uplink transmission configuration indication field in the downlink control information.

14. The apparatus of claim 13, wherein the user equipment uses spatial relation information configured for a sounding reference signal resource indicated by a sounding reference signal resource index field of the downlink control information if the uplink transmission configuration indication field points to an uplink transmission configuration indication codepoint not activated by the medium access control control element message, or a reserved uplink transmission configuration indication codepoint.

15. The apparatus of claim 14, wherein the user equipment uses a spatial domain filter that receives the downlink control information for transmitting the codebook-based physical uplink shared channel transmission if the spatial relation information for the sounding reference signal resource is not configured.

16. The apparatus of claim 15, wherein the user equipment determines the spatial domain filter for the codebook-based physical uplink shared channel transmission based on a control resource set pool index of a control resource set used to receive the downlink control information.

17. The apparatus of claim 14, wherein the user equipment uses a spatial domain filter that receives a control resource set if the spatial relation information for the sounding reference signal resource is not configured.

18. The apparatus of claim 14, wherein the user equipment uses a spatial domain filter that receives a control resource set with a lowest control resource set identifier configured on a carrier to transmit the codebook-based physical uplink shared channel transmission if the spatial relation information for the sounding reference signal resource is not configured.

19. The apparatus of claim 13, wherein the medium access control control element message activates an uplink transmission configuration indication for each control resource set pool index of a plurality of control resource set pool indexes separately.

20. The apparatus of claim 19, wherein the user equipment determines an uplink transmission configuration indication state to use based on an uplink transmission configuration indication field and the control resource set pool index of a control resource set used to receive the downlink control information.

* * * * *